(12) United States Patent
Smith

(10) Patent No.: US 6,536,676 B2
(45) Date of Patent: Mar. 25, 2003

(54) VALVES

(75) Inventor: John Cambridge Smith, Steyning (GB)

(73) Assignee: The BOC Group plc, Windlesham (GB)

(*) Notice: Subject to any disclaimer, the term of this patent is extended or adjusted under 35 U.S.C. 154(b) by 0 days.

(21) Appl. No.: 09/993,042

(22) Filed: Nov. 6, 2001

(65) Prior Publication Data

US 2002/0074418 A1 Jun. 20, 2002

(30) Foreign Application Priority Data

Nov. 7, 2000 (GB) .............................. 0027190

(51) Int. Cl.[7] .......................... G05D 23/00; G05D 23/02
(52) U.S. Cl. ...................................... 236/87; 236/101 E
(58) Field of Search ................. 236/87, 93 R, 236/101 E

(56) References Cited

U.S. PATENT DOCUMENTS

| | | | | |
|---|---|---|---|---|
| 29,155 A | * | 7/1860 | Mears et al. .................. | 169/37 |
| 2,271,850 A | * | 2/1942 | Zinkil ....................... | 236/80 R |
| 3,757,866 A | * | 9/1973 | Mears et al. .................. | 169/37 |
| 3,812,914 A | * | 5/1974 | Mears ......................... | 169/20 |
| 4,016,853 A | * | 4/1977 | Bible ....................... | 123/198 R |
| 4,128,128 A | * | 12/1978 | Mears ......................... | 169/37 |
| 4,917,294 A | | 4/1990 | Bergmann et al. | |
| 5,878,949 A | * | 3/1999 | Matsui et al. ................. | 236/87 |

FOREIGN PATENT DOCUMENTS

| JP | 57033275 A | 2/1982 |
|---|---|---|
| JP | 58187671 A | 11/1983 |

* cited by examiner

Primary Examiner—William E. Tapolcai
Assistant Examiner—Mohammad M. Ali
(74) Attorney, Agent, or Firm—Ira Lee Zebrak; Salvatore P. Pace

(57) ABSTRACT

A valve assembly comprising a housing having an inlet and space therefrom an outlet, means located in the housing for controlling the flow of fluid between the inlet and the outlet, said means including a main valve movable between a first relatively closed position and a second open position, said movement being controlled by a pilot valve assembly including a temperature sensitive member such that when the temperature in the fluid reaches a predetermined value the pilot valve is opened thereby allowing the main valve to move from said first to said second open position.

4 Claims, 2 Drawing Sheets

VALVE CLOSED (COLD)

VALVE CLOSED (COLD)

VALVE OPEN (HOT)
(FULL FLOW)

VALVES

This application claims priority from British patent application serial no. 0027190.8 filed Nov. 7, 2000.

FIELD OF THE INVENTION

The present invention relates to valve assemblies.

OBJECT OF THE INVENTION

It is an object of the present invention to provide a valve assembly which operates within a fluid cooling system for, for example a vacuum pump to reduce the fluid flow when not required and to open when full flow is needed.

SUMMARY OF THE INVENTION

According to the present invention, a valve assembly comprises a housing having an inlet and spaced therefrom an outlet, means located in the housing for controlling the flow of fluid between the inlet and the outlet, said means including a main valve movable between a first relatively closed position and a second open position, said movement being controlled by a pilot valve assembly including a temperature sensitive member such that when the temperature of the fluid reaches a predetermined value the pilot valve is opened thereby allowing the main valve to move from said first to the second position.

Preferably, the heat sensitive member is in the form of one or more bimetallic discs which when subjected to a temperature above a predetermined value will cause the pilot valve to open thereby allowing the main valve to move from its first to its second position.

In one embodiment the main valve has formed therein at least one notch which allows the passage of fluid from the inlet towards the outlet when the main valve is in the first relatively closed position.

DETAILED DESCRIPTION OF THE INVENTION

An embodiment of the invention will now be described, by way of example, reference being made to the Figures of the accompanying diagrammatic drawings.

Figure 1:
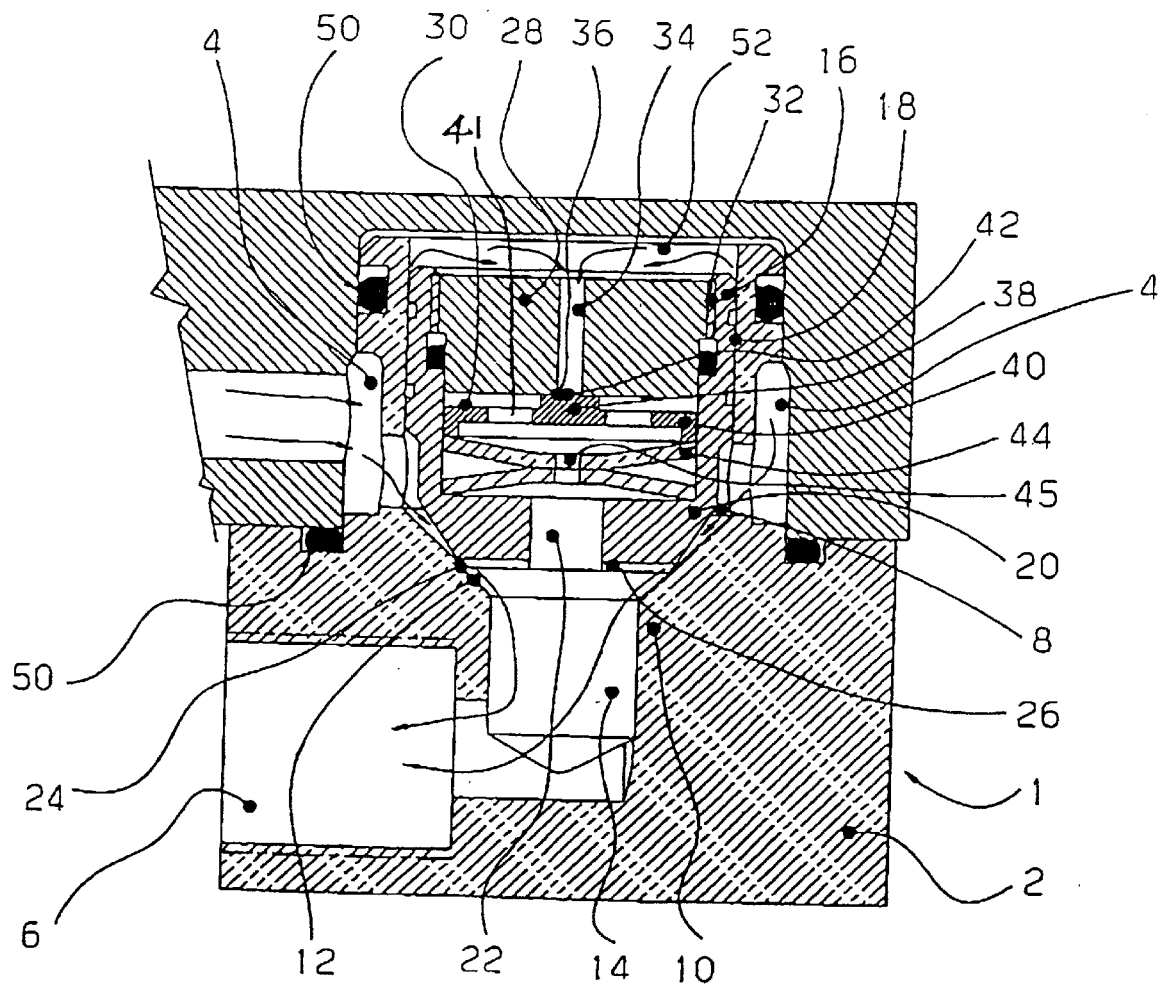
FIG. 1 is a cross-sectional view of the valve according to the present invention in its relatively closed position.
Figure 2:
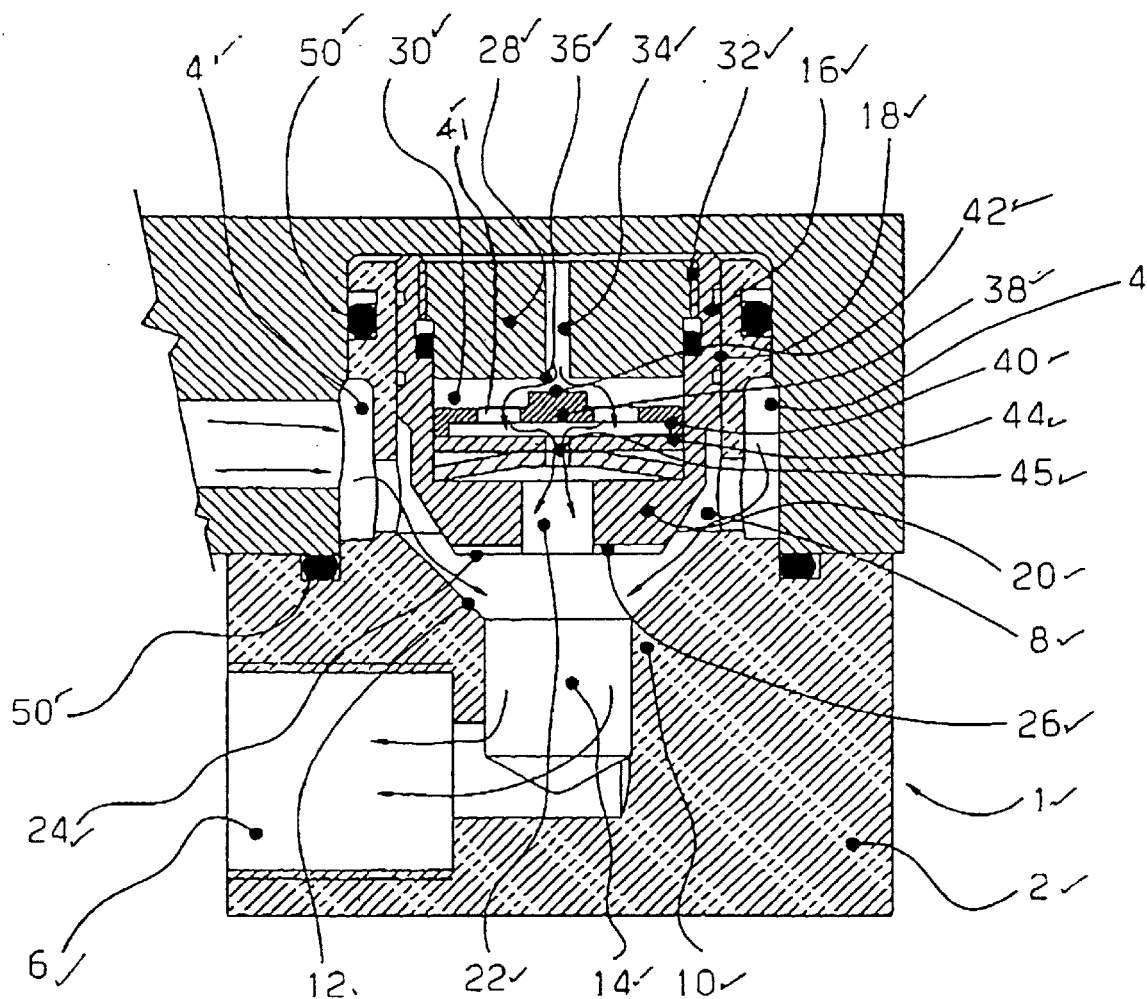
FIG. 2 is a cross-sectional view of the valve according to the present invention with the valve in its open position.

Referring to FIGS. 1 and 2, a valve assembly 1 for controlling the temperature of a cooling fluid for use for example with a vacuum pump (not shown) comprises a main housing 2 in which is formed an inlet 4 and space therefrom an outlet 6 for the cooling fluid. Intermediate the inlet 4 and outlet 6 is a chamber 8 formed in the main housing 2. The chamber 8 is formed on its base 10 with a valve seating 12 which surrounds a through-hole 14 communicating with the outlet 6. Located in the chamber 8 is a first main valve 16.

The main valve 16 is a slide-fit within the chamber 8 and comprises an outer thin-walled body 18 which is a slide fit allowing a controlled leakage of cooling fluid from the inlet 4 up (as shown) between the inner surface of the chamber 8 and the co-operating outer surface of the body 18 towards the upper (as shown) end of the chamber 8. The base 20 of the body 18 is formed with a through-hole 22 in substantial alignment with the hole 14 and surrounding the hole 22 is a valve surface 24 for engaging the valve seating 12 in the relatively closed position of the valve assembly 1 (see FIG. 1). Formed in the valve surface 24 are notches 26 which permit limited flow of cooling fluid between the inlet 4 and the outlet 6 in the (relatively) closed mode of the valve assembly 1.

A member 28 is provided in the body 18 which is spaced from the base 20 and defines therewith a further chamber 30. The member 28 sits in a recess formed in the inner surface of the body 18 and is maintained in position by an adjustable thread 32 or other means. A through hole 34 is formed in the member 28, the lower (as shown) circumferential edge of which forms a valve sealing 36 co-operating with a pilot valve assembly 38.

The pilot valve assembly 38 is located in the chamber 30 and comprises a member 40 formed with a plurality of spaced holes 41 which is a slide-fit within the chamber 30. Also formed on the member 40 is a central valve face 42 which co-operates with the valve seating 36.

Located beneath (as shown) the member 40 within the chamber 30 is a heat sensitive member in the form of a plurality of bimetallic discs 44 each with a central hole 45.

As shown, the valve assembly 1 is located in a sealing tight manner with the aid of seals 50 in a line through which flows a cooling fluid for example water for cooling a vacuum pump. The valve assembly 1 is so fitted that a space 52 is defined between the upper surface of the member 28 and a facing surface of the line carrying the cooling fluid.

When the full flow of the cooling fluid is not required, that, when only minimal flow is required the valve assembly 1 will be as shown in FIG. 1. Some fluid from the pump to be cooled or being cooled will pass directly from the inlet 4 via the notches 26, the hole 14 to the outlet 6 and hence back towards the water return pump. The remainder of the fluid from the pump will pass from the inlet 4 and along the slide-fit between the inner surface of chamber 8 and the outer surface of the body 18 and into the space 52 between the surface of the line carrying the fluid and the member 28 to create a force biasing the main valve 16 downwardly to its closed position. At the same time, the pilot valve is also closed with the bimetallic discs 44 biasing the member (upwardly) as shown so that the valve face 42 engages the seating 36 in a fluid tight manner.

Thus, in the position shown in FIG. 1 the valve assembly will allow only a minimum quantity of cooling fluid to pass between the inlet 4 and the outlet 6.

If now the temperature of the cooling fluid rises beyond a preselected value then the bimetallic discs 44 will move causing the pilot valve to open. That is, the member will follow the movement of the discs downwardly (as shown) so that the valve face 42 will separate from the valve seating 36 thereby allowing the cooling fluid to pass therethrough and then through the holes 41 in the member 40 and hence through the holes 45, 22 and 14 to the outlet 6.

At the same time, the release of pressure from the fluid in the space 52 above the member 28 will allow the main valve to lift allowing the full flow of fluid between the inlet 4 and the outlet 6 (see FIG. 2).

The valve assembly 1 will continue to "flip" between the minimum and maximum flow positions to maintain the cooling fluid within a preselected temperature band or control in a mid-position depending on bimetal disc design.

Preferably, the body 18 is made from brass which readily conducts heat to the discs 44 thereby minimising thermal delay.

It will be evident that the valve assembly 1 operates in a fluid cooling system to reduce the flow when not required and to open to full flow when needed. This is achieved by the use of the temperature sensitive member for example the bimetallic discs 44 which are sensitive to the temperature of the cooling fluid.

In a modification a spring may be incorporated to bias the main valve 16 from the full open position (FIG. 2) to the relatively closed position (FIG. 1).

The valve assembly if mounted directly on to a hot surface of a pump can be used to switch some or all of the fluid flow by sensing the temperature of the surface. In such an application the minimum flow could be zero and this would be achieved by doing away with the notches 26 so that the main valve 16 creates a fluid tight seal when in its closed position.

The notches 26 offer a particular advantage in that if they were in the form of fixed holes they could be blocked by contaminants carried by the cooling fluid. However, when the valve assembly 1 is open the fluid flow flushes the notches 26.

While the present invention has been particularly shown and described with reference to preferred embodiments thereof, it will be understood by those skilled in the art that various changes in form and details may be made therein without departing from the spirit and scope of the invention.

I claim:

1. A valve assembly comprising a housing having an inlet and space therefrom an outlet, means located in the housing for controlling the flow of fluid between the inlet and the outlet, said means including a main valve movable between a first relatively closed position and a second open position, said movement being controlled by a pilot valve assembly including a temperature sensitive member such that when the temperature in the fluid reaches a predetermined value the pilot valve is opened thereby allowing the main valve to move from said first to said second open position, the main valve having formed therein at least one notch which allows the passage of fluid from the inlet towards the outlet when the main valve is in the first relatively closed position.

2. The valve assembly as in claim 1 wherein the main valve comprises an outer thin walled body the base of which together with a member defines a chamber in which is located the pilot valve assembly, the member being formed with a hole which defines a valve seat for co-operating with a valve face of the pilot valve assembly.

3. The valve assembly as in claim 2 wherein the thin walled body is made from brass.

4. A valve assembly comprising a housing having an inlet and space therefrom an outlet, means located in the housing for controlling the flow of fluid between the inlet and the outlet, said means including a main valve movable between a first relatively closed position and a second open position, said movement being controlled by a pilot valve assembly including a temperature sensitive member such that when the temperature in the fluid reaches a predetermined value the pilot valve is opened thereby allowing the main valve to move from said first to said second open position, the heat sensitive member is in the form of one or more discs which when subjected to a temperature above a preselected value will cause the pilot valve to open thereby allowing the main valve to move from its first to its second position, in which the main valve having formed therein at least one notch which allows the passage of fluid from the inlet towards the outlet when the main valve is in the first relatively closed position.

* * * * *